(12) United States Patent
Green et al.

(10) Patent No.: US 7,116,540 B2
(45) Date of Patent: Oct. 3, 2006

(54) DEVICE FOR INDUCTIVELY TRANSMITTING ELECTRICAL ENERGY

(75) Inventors: Andrew Green, Malsburg-Marzell (DE); Keith Thompson, Eimeldingen (DE); Mathias Wechlin, Kandern (DE)

(73) Assignee: Wampfler Aktiengesellschaft, Weil am Rhein-Märkt (DE)

( * ) Notice: Subject to any disclaimer, the term of this patent is extended or adjusted under 35 U.S.C. 154(b) by 162 days.

(21) Appl. No.: 11/006,458

(22) Filed: Dec. 6, 2004

(65) Prior Publication Data

US 2005/0146830 A1 Jul. 7, 2005

Related U.S. Application Data

(63) Continuation of application No. PCT/EP03/01509, filed on Feb. 14, 2003.

(30) Foreign Application Priority Data

Jun. 6, 2002 (DE) ................................ 102 25 005

(51) Int. Cl.
*H01H 47/00* (2006.01)

(52) U.S. Cl. ..................................... 361/143
(58) Field of Classification Search ................. 361/143
See application file for complete search history.

(56) References Cited

U.S. PATENT DOCUMENTS 2,264,533 A * 12/1941 Johnston .................... 246/34 R
5,293,308 A 3/1994 Boys et al.
5,585,721 A * 12/1996 Datsikas ...................... 324/318
6,848,547 B1 * 2/2005 Odachi et al. ................. 191/10
2002/0145996 A1 * 10/2002 Robinson et al. ........... 370/352

FOREIGN PATENT DOCUMENTS

| DE | 42 36 340 C2 | 11/1994 |
| DE | 44 29 656 C1 | 4/1996 |
| DE | 196 06 277 A1 | 8/1997 |
| DE | 197 23 879 C1 | 8/1998 |
| DE | 100 14 954 A1 | 10/2001 |
| EP | 0 289 868 | 9/1988 |
| WO | WO 92/17929 | 10/1992 |
| WO | WO 95/28723 A | 10/1995 |
| WO | PCT/EP2003/001509 | 10/2004 |

* cited by examiner

*Primary Examiner*—Brian Sircus
*Assistant Examiner*—Ann T. Hoang
(74) *Attorney, Agent, or Firm*—Martin Fleit; Paul D. Bianco; Fleit Kain Gibbons Gutman Bongini & Bianco, P.L.

(57) ABSTRACT

A device for inductively transmitting electrical energy to at least one mobile load, with at least one primary conductor that extends along a designated path of the load in the form of a conductor loop and from which a secondary conductor arranged on the load is able to draw electrical energy. At least two conductor loops are provided that are electrically separated from one another and respectively assigned to different segments of the path. The conductor loops are arranged relative to one another so that electrical energy intended for the load can be transmitted from a first conductor loop to at least a second conductor loop due to inductive coupling between the conductor loops. A section of the second conductor loop that is inductively coupled contains a larger number of windings than that of the first conductor loop. The second conductor loop includes of a series of partial loops that extend parallel to one another.

24 Claims, 4 Drawing Sheets

DEVICE FOR INDUCTIVELY TRANSMITTING ELECTRICAL ENERGY

RELATED APPLICATION

This application is a continuation of International Application No. PCT/EP03/01509, filed Feb. 14, 2003, the contents of which are here incorporated by reference in their entirety. The benefits of 35 USC Section 120 are here claimed.

BACKGROUND OF THE INVENTION

1. Field of the Invention

The invention pertains to a device for inductively transmitting electrical energy.

2. Prior Art

A device of this type is known, for example, from WO 92/17929 and serves for transmitting electrical energy to at least one mobile load without mechanical or electrical contact. This device consists of a primary part and a secondary part that are electromechanically coupled similarly in principle to a transformer. The primary part comprises supply electronics and a conductor loop laid along a path. One or more pickups and the corresponding pickup circuitry form the secondary part. In contrast to a transformer, in which the primary and the secondary part are coupled as closely as possible, this system consists of a loosely coupled system. This is possible due to the relatively high operating frequency in the kilohertz range; it can bridge large air gaps up to a few centimeters. Here, the operating frequency on the secondary side is defined as the resonant frequency of a parallel resonant circuit formed by connecting a capacitor in parallel with the pickup coil.

The advantages of this type of energy supply include, in particular, the elimination of wear and the associated maintenance procedures, where the energy supply is also shockproof and the energy is readily available. Typical applications are automated material transport systems in manufacturing plants, as well as passenger transport systems, such as electrically driven buses and trains, for example, overhead trolleys.

Many of these applications require a variable route layout. For example, it may be necessary subsequently to extend or install a junction in an already installed route segment. Due to the relatively high frequency used for suppressing the skin effect, the cable for the primary conductor loop is usually realized in the form of litz wires, i.e., a wire constructed of individual film insulated wires bunched or braided together in a uniform pattern of twists and length of lay. Simply, it consists of a number of individual, separately insulated strands. Consequently, it is very complicated to separate an installed cable and to connect a second cable to such a junction. The alternative solution of providing the additional route segment with a separate power feed is equally costly.

A related problem is the realization of switches, i.e., route junctions for rail-bound vehicles at which a vehicle can selectively travel in one of several directions. In order to achieve an uninterrupted inductive power supply along switches, movable primary conductor sections that are able to participate in the movement of the switch must be provided at this location. These movable primary conductor sections are usually connected to the primary conductors that are permanently installed along the adjacent path segments by means of flexible drum cables. One example of such a switch construction is disclosed in DE 100 14 954 A1. Here, it is also necessary either to separate and connect the primary conductor litz wires to the drum cables or to provide several separate power feeds.

SUMMARY OF THE INVENTION

In light of the foregoing prior art, the invention aims to propose a simpler and less expensive means of realizing a variable path layout for a device for inductively transmitting electrical energy.

According to the invention, this objective is realized by a device with the characteristics disclosed in the following. Advantageous embodiments of the invention are also disclosed.

The inductive coupling principle that was originally intended solely for the transmission of energy to a mobile load is also utilized, according to the invention, for the transmission of energy between different primary conductors. It is preferred that the sections of two primary conductors to be coupled are respectively wound around ferromagnetic cores in order to concentrate the magnetic field and to achieve the highest coupling factor possible, i.e., two primary conductors are connected by a transformer, the windings of which are formed by the two primary conductors themselves. This transformer is wound on a split ferromagnetic core.

It is particularly advantageous that the secondary primary conductor, i.e., the primary conductor into which energy is fed by the other primary conductor on a time-average basis, has a larger number of windings, i.e., the voltage is stepped up and the current is simultaneously stepped down during the transmission. Less current requires a correspondingly smaller conductor cross section such that a stranded cable can be eliminated on the secondary side. In order to make still available the same magnetic flux density for the collector on the load side, the secondary primary conductor merely needs be installed in the form of the corresponding number of loops, wherein these loops can be realized with a multiwire cable, the wires of which are suitably interconnected. Another significant advantage of stepping down the current can be seen in the option of switching off the secondary primary conductor directly behind the coupling transformer by means of a short-circuit switch that can have a comparatively low rating. This may be useful in connection with safety requirements.

The invention is also particularly suitable for realizing switches for rail-mounted vehicles, e.g., electrical overhead trolleys. Here, the movement of the switch causes different secondary cores to be moved toward the primary core arranged at the end of the incoming rail depending on the intended travel direction such that electrical energy is always supplied to the correct section of the switch, i.e., the section of the switch to be traversed in accordance with the current switch position. In this context, one also has available advantageous options for realizing safety zones in front of switches, in which the energy supply of an arriving vehicle is interrupted outside the permissible end positions of the switch.

BRIEF DESCRIPTION OF THE DRAWINGS

Embodiments of the invention are described below with reference to the figures. In the figures.

DETAILED DESCRIPTION OF PREFERRED EMBODIMENTS OF THE INVENTION

Figure 1:
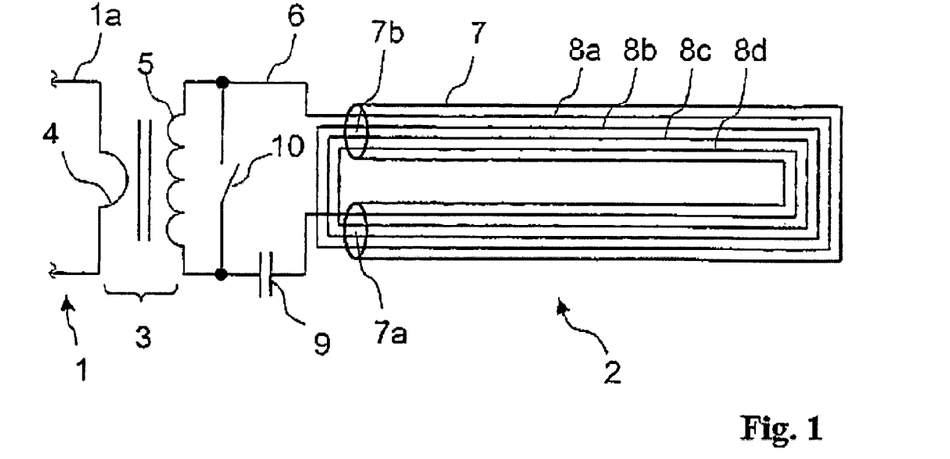
FIG. 1 shows a schematic representation of a device according to the invention.

FIG. 1 schematically shows the inductive coupling of two electrically separated conductor loops 1 and 2 in accordance with the invention, wherein only a small portion of the conductor loop 1 is visible in FIG. 1 and the conductor loop 2 is drawn much shorter in relation to its width. Both conductor loops 1 and 2 respectively form the primary side of a system for inductively transmitting electrical energy to a mobile load that draws the energy from the magnetic field generated by the current in the respective conductor loop 1 or 2 by means of a pickup. In this case, the conductor loop 1 is connected to not-shown supply electronics that supply current to the conductor loop 1. However, the current can only be induced in the conductor loop 2 by the current in the conductor loop 1. For this purpose, the two conductor loops 1 and 2 are coupled by means of a transformer 3. Since the conductor loop 1 lies on the primary side of this transformer 3 and the conductor loop 2 on the secondary side, the conductor loop 1 is also referred to as the primary conductor loop and the conductor loop 2 as the secondary conductor loop in the following description.

The unusual feature of the transformer 3 is that it does not represent a self-contained physical unit. Its primary winding 4 and its secondary winding 5 form separate units that can be reversibly moved toward or away from each other. Like a conventional plug-type connection that serves for reversibly producing an electrical contact between two lines, the transformer 3 can also be referred to as a plug-type connection; however, it merely serves for inductively coupling the two conductor loops 1 and 2 rather than for producing an electrical connection between the conductor loops.

As indicated in FIG. 1, the primary winding 4 of the transformer 3 contains a smaller number of windings than the secondary winding 5. FIG. 1 shows an example turns ratio of 1:4, where the primary winding 4 consists of only one winding and the secondary winding consists of four windings. As is generally known, this causes the voltage on the secondary side to be higher by a factor of four while the current is lower by a factor of four. If the conductor 6 on the secondary side were to be installed in the form of a single loop like the loop-shaped installation of the conductor 1a on the primary side, this would result in a magnetic field strength that is lower by a factor of four and, consequently, a substantial reduction of the electrical power that can be inductively transmitted to the load.

The lowering of the current is compensated for by installing the conductor 6 on the secondary side in the form of a multi-loop 2, the multiple of which corresponds to the turns ratio of the transformer 3. This is the reason a quadruple secondary loop 2 is provided in the example shown in FIG. 1 that has a turns ratio of 1:4. Since the loop 2 is quadrupled, approximately the same magnetic field is obtained as that generated by a current that is higher by a factor of four.

The high expenditure of labor associated with installing a single conductor 6 in the form of a quadruple loop can be prevented by installing a single cable 7 with four wires 8a–8d in the form of a single loop 2 and connecting the four individual wires 8a–8d of both ends 7a and 7b of the cable 7 in paired fashion at the beginning of the loop 2 such that a quadruple loop is obtained. In the embodiment shown, the end 7a of the wire 8a is connected to the end 7b of the wire 8b; the end 7a of the wire 8b is connected to the end 7b of the wire 8c; and the end 7a of the wire 8c is connected to the end 7b of the wire 8d. At the end 7b, the wire 8a extends from the cable 7 and is connected to the conductor 6 of the secondary winding 5. An optional variation in this context would be the utilization of a cable 7 with a number of wires that corresponds to a multiple of the number of loops required due to the turns ratio. For example, a quadruple loop can be realized by utilizing a cable with sixteen wires that are combined into four bundles, wherein said bundles respectively comprise four wires that are connected in parallel. These four bundles are then wired together analogous to the four wires 8a–8d in FIG. 1.

Tuning capacitors are typically inserted into the secondary conductor loop 2 and form a series resonant circuit with the inductances of the secondary winding 5 and the conductor loop 2. In FIG. 1, these tuning capacitors are indicated by a capacitor 9 between the conductor 6 that forms the secondary winding 5 and the wire 8d at the end 7a of the cable 7. The ratings of the tuning capacitors are chosen such that said resonant circuit resonates at the operating frequency of the system, and such that the tuning of the primary conductor loop 1 to the resonant frequency is influenced as little as possible by the presence or absence of the secondary conductor loop 2 at the operating frequency that is likewise defined by series capacitors. Thus the input impedance of the primary conductor loop 1 due to the supply electronics should, if possible, be influenced as little as possible by connecting or disconnecting the secondary conductor loop 2 in the form of respectively moving the secondary winding 5 toward or away from the transformer 3. This eliminates the need for adaptive measures on the side of primary conductor loop 1 and the supply electronics when the secondary conductor loop 2 is connected or disconnected.

In addition to eliminating the need for a stranded cable 7 for realizing the secondary conductor loop 2, the lowering of the current on the secondary side by means of the transformer 3 also simplifies the switching off of the secondary conductor loop 2. A switch 10 provided for this purpose short-circuits the secondary winding 5 directly to the transformer 3 and thus renders the cable 7 essentially currentless. This switch 10 only need withstand a short-circuit current that is significantly reduced in accordance with the turns ratio of the transformer 3 and consequently can be realized with relatively low expenditure. Once the current is switched off, the load can no longer draw electrical power in the displacement path that is supplied by the secondary conductor loop 2. This may be of interest or even required for safety reasons; for example, in order to close a path segment for maintenance or to ensure safe distances between different vehicles on paths that are used by several vehicles, i.e., by rendering the path segments currentless. For example, it is known from railroad traffic engineering to divide a route into a sequence of blocks, the length of which respectively corresponds to at least the maximum stopping distance of a vehicle, and to always maintain one block free between two blocks, on which different vehicles travel simultaneously.

Figure 2:
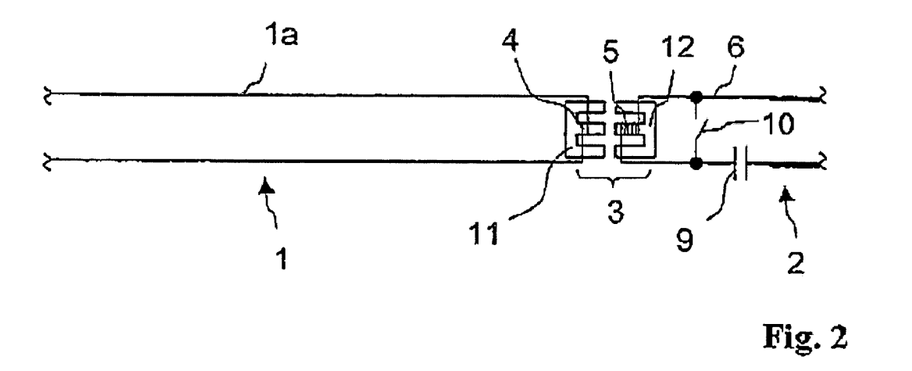
FIG. 2 shows the extension of a primary conductor loop by means of a device according to the invention.
Figure 3:
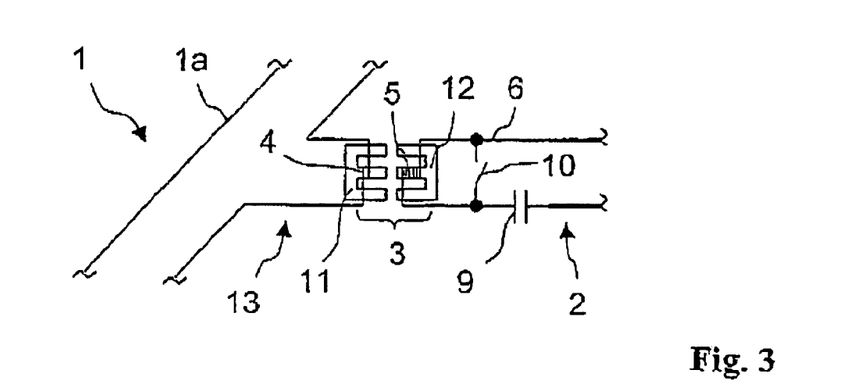
FIG. 3 shows the coupling of a junction to a primary conductor loop by means of a device according to the invention.

One possible embodiment of the transformer 3 is illustrated in FIGS. 2 and 3. The transformer 3 is respectively formed by two E-shaped ferromagnetic cores 11 and 12, the legs of which point toward and are aligned with each other in the coupled state. The distance between the two cores 11 and 12 is very small or the cores are in direct physical contact. With respect to the spacing, the cores 11 and 12 are illustrated not-to-scale in FIGS. 2 and 3. The windings 4 and 5 are respectively located on the center leg. The primary side contains a single winding while the secondary side contains four windings. Naturally, this turns ratio as well as the E-shape of the cores 11 and 12 have a purely example character. The scope of the present invention includes, in principle, other turns ratios as well as other known core shapes, e.g., U-cores or pot cores. The remaining components shown are identified in FIGS. 2 and 3 by the same reference symbols as in FIG. 1 and require no further explanation.

The embodiment according to FIG. 2 represents an extension of a first conductor loop 1 with a second conductor loop 2. The primary part of the transformer 3 that consists of the core 11 and the winding 4 is accordingly arranged at the end of the conductor loop 1, i.e., at the return point of the conductor 1a that forms the conductor loop 1. This embodiment is suitable, for example, for subsequently extending a path along which a vehicle to be inductively supplied with electrical energy should travel. Instead of separating the conductor loop 1 at the return point of the conductor 1a and connecting the two thus formed ends of the conductor 1a to the ends of a conductor 6 that forms an extension in the form of a second conductor loop 2, the end of the conductor loop 1 is wound around the center leg of the E-core 11 once and the second conductor loop 2 that serves as the extension is inductively coupled to the conductor loop 1 by means of the winding 5 on the center leg of the E-core 12 that consists of four windings. Although advantageous, it is not absolutely imperative that the primary winding 4 of the transformer 3 consist of only a single winding, because the length of the primary conductor loop 1 is only slightly shortened in this case. Another example application of the embodiment shown in FIG. 2 is discussed further below with reference to FIGS. 4–6.

The embodiment according to FIG. 3 represents a lateral junction between a first conductor loop 1 and a second conductor loop 2. The primary part of the transformer 3 that consists of the core 11 and the winding 4 is accordingly arranged on a lateral bulge 13 of the conductor 1a that forms the conductor loop 1 rather than that on its return point. The design of the transformer 3 and the components of its secondary side correspond to those of the embodiment shown in FIG. 2. The embodiment according to FIG. 3 is suitable, for example, for subsequently expanding a path along which a vehicle to be inductively supplied with electrical energy should travel with an additional route segment that branches off laterally. Since a comparatively long section of this conductor 1a is required in this case for the lateral bulge 13 of the primary conductor 1a, the expansion option must here be taken into account during the installation of the primary conductor loop 1 and the conductor 1a must have sufficient excess length. In this case, it is particularly advantageous that one has the option of rendering the lateral branch segment currentless, if so required, by means of the short-circuit switch 10 such that vehicles are reliably prevented from entering.

Figure 4:
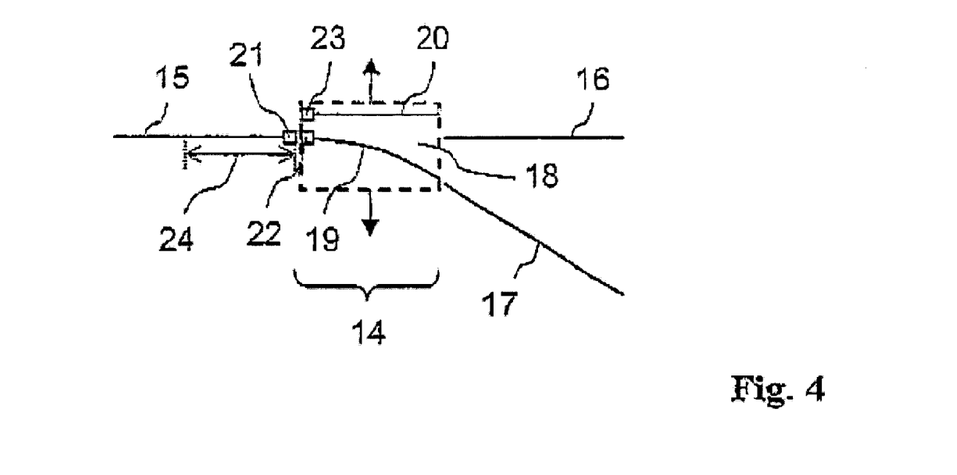
FIG. 4 shows a schematic representation of a device according to the invention that is used for supplying a switch of a monorailway.
Figure 5:
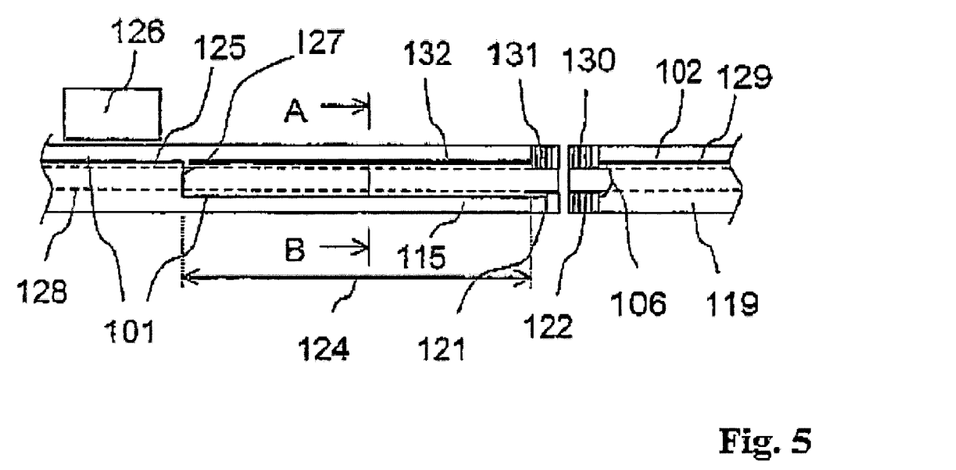
FIG. 5 shows a top view of an enlarged detail of a monorailway switch, in which the electrical energy transmission is schematically indicated.
Figure 6:
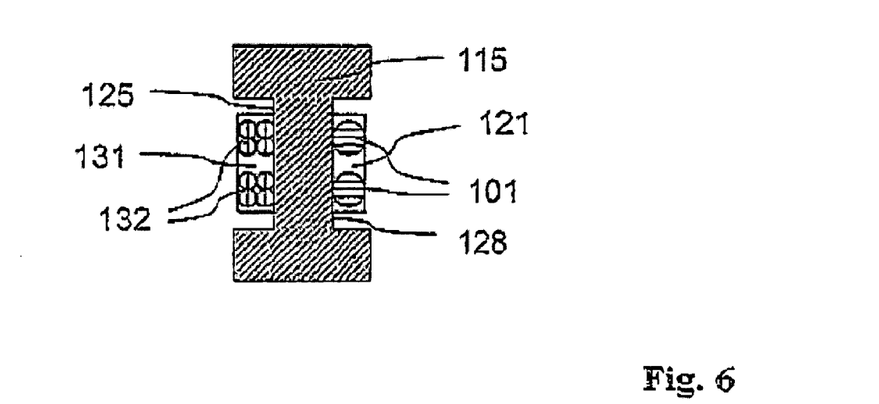
FIG. 6, shows a cross section along line A–B in FIG. 5.

FIGS. 4–6 show embodiments of the present invention for realizing a switch of a monorail, for example, in the form of an electrical overhead railway. FIG. 4 initially shows the design of a switch 14 used for realizing junctions in railways of this type. The switch 14 selectively connects an incoming rail 15 to one of two outgoing rails 16 and 17, wherein the terms incoming and outgoing refer to the travel direction. For this purpose, the switch 14 contains two rail sections 19 and 20 on a support 18 that is illustrated with broken lines in FIG. 4. The support 18 can be displaced transverse to the direction of the aligned straight rails 15 and 16, namely between two end positions, as indicated with two arrows in FIG. 4. In the end position shown, the curved rail section 19 connects the incoming rail 15 to the outgoing rail 17. In the other not-shown end position of the support 18, the straight rail section 20 connects the incoming rail 15 to the outgoing rail 16.

As initially mentioned, the energy supply of the vehicle also must be maintained in the region of the switch 14. Flexible drum cables are conventionally utilized for this purpose. The present invention provides an advantageous alternative, in which the inductive transmission of energy by means of conductor loops running along rails 15, 16 and 17 also makes it possible to transmit energy inductively to the movable rail sections 19 and 20 either from the incoming rail 15 or from both outgoing rails 16 and 17.

FIG. 4 shows the first-mentioned variation that requires a primary winding 21 at the end of the rail 15 and one respective secondary winding 22 and 23 at the ends of the rail sections 19 and 20. In this case, the windings 21, 22 and 23 are arranged on the rail ends in such a way that the alignment relative to the transformer 3 shown in FIG. 2 is attained in both end positions of the switch 14. In this case, the windings 21–23 preferably are arranged on ferromagnetic cores as shown in FIG. 2. The primary winding 21 forms a transformer together with the secondary winding 22 in one end position of the switch 14 and together with the secondary winding 23 in the other end position. Thus, the correct rail section 19 or 20 is always automatically inductively supplied with energy by the incoming rail 15 as a function of the position of the switch 14. For this purpose, a short secondary conductor loop of the type described above with reference to FIG. 1 respectively extends along the rail sections 19 and 20 from the secondary windings 22 and 23. These conductor loops are not illustrated in FIG. 4 in order to provide a better overview.

It would also be possible, in principle, to supply the movable rail sections 19 and 20 with energy inductively from the outgoing rails 17 and 16, respectively. However, this would require primary windings on both outgoing rails 17 and 16 while only a single primary winding would be required on the incoming rail 15 in order to supply both movable rail sections 19 and 20. In order to reduce the expenditure, the above-described supply by the incoming rail 15 is preferred.

It would also be conceivable to arrange two additional primary windings at both ends of the rail sections 19 and 20 in addition to the windings 21–23, and to arrange two additional secondary windings at both ends of the outgoing rails 16 and 17 that face the switch 14. In the position of the switch 14 shown in FIG. 4, the incoming rail 15 initially inductively supplies the rail section 19 with electrical energy, and this rail section inductively supplies the outgoing rail 17 with electrical energy. In the other position of the switch 14, the incoming rail 15 initially inductively supplies the rail section 20 with electrical energy, and this rail section inductively supplies the outgoing rail 16 with electrical energy. Here, one of the outgoing rails 16 or 17 would not be supplied with electrical energy, as a function of the position of the switch 14. Alternatively, a separate supply of power may be respectively provided for the conductor loops that extend along these rails 16 and 17, or the conductor loop extending along the incoming rail 15 may lead to one of the rails 16 or 17 around the switch 14 and continue along the respective rail in order to eliminate the need for supplying power separately.

In a switch 14 of a monorail, safety regulations stipulate that the energy supply must be switched off in a certain safety region 24 of the incoming rail 15 that lies in front of the switch 14 if the switch 14 is not located in one of its two end positions. This prevents a vehicle from entering the switch 14 in this state of the switch 14. This is typically realized with the aid of a digital control that monitors the position of the switch by means of limit switches arranged on the support 18 and switches off the energy supply of the rail 15 within the safety region 24 outside the two end positions. The present invention also makes it possible to realize low-expenditure and consequently advantageous, solutions to this problem. The first solution is discussed below with reference to FIGS. 5 and 6. With respect to components that correspond to the embodiment shown in FIGS. 1–4, the reference symbols used in these figures result from adding 100 to the reference symbols used in FIGS. 1–4.

FIG. 5 initially shows a top view of an enlarged detail of a monorailway switch, in which energy is inductively transmitted to the vehicle, namely the transition from the incoming rail 115 of the switch to a movable rail section 119, as well as the safety region 124 at the end of the rail 115. In this case, the length of the safety region 124 is illustrated not-to-scale in relation to the width of the rail 115. According to the cross section through the rail 115 that is illustrated in FIG. 6 and extends along line A–B in FIG. 5, the rail 115 has the conventional I-shaped profile of railroad rails. In an electrical overhead railway, the rollers that transmit the weight of the vehicle to the rail 115 move along the upper surface of the profile. Additional rollers that move on the outer lateral surfaces transmit the lateral forces over curves. The mechanical components of the vehicle are not of interest in this context and thus are not illustrated in the figures.

In order to supply the vehicle with energy inductively, a conductor loop 101 is arranged on an inner lateral surface 125 on one side of the rail 115. The inductive pickup 126 of the vehicle that draws electrical energy for supplying the vehicle from the conductor loop 101 is thus also situated on the same side of the rail 115 as the conductor loop 101 and slightly separated from it.

The conductor loop 101 changes over to the other side of the rail 115, for example, through two transverse bores, at a point 127 that represents the beginning of the safety zone 124. From this point on, the conductor loop extends along the other inner lateral surface 128 of the rail 115. The inner lateral surfaces 125 and 128 are drawn with broken lines in FIG. 5. Due to the increased distance from the pickup 126 and the shielding effect of the rail 115 that usually consists of metal, e.g., aluminum, the magnetic coupling between the conductor loop 101 and the pickup 126 no longer suffices for inductively transmitting significant electrical power.

At the end of the rail 115, the conductor loop 101 forms a primary winding 121, where a secondary winding 122 lies opposite said primary winding in the assumed end position of the switch on the side of the movable rail section 119. Both windings 121 and 122 preferably are wound on ferromagnetic cores, analogously to the embodiments shown in FIGS. 2 and 3. The exact arrangement of the windings 121 and 122 depends on the available space. In this respect, it would be conceivable to utilize, in particular, the space between the two horizontal legs of the I-shaped rail profile as indicated in the cross section shown in FIG. 6 or the underside of the rail. Due to the magnetic coupling of the windings 121 and 122, electrical power is fed to a secondary conductor loop 102 that extends along an inner lateral surface 129 of the rail section 119 that is aligned with the inner lateral surface 125 of the rail 115. This conductor loop 102 consists of a quadruple loop similarly to the conductor loop 2 described above with reference to FIG. 1. It is connected to the secondary winding 122 by means of a conductor 106, where the former is not arranged on the side of the rail section 119 that contains the conductor loop 102, but rather on the opposite side.

The described design of the conductor loops 101 and 102 would make it possible, always inductively, to transmit energy to the pickup 126 along the rail 115 up to the point 127 that represents the beginning of the safety zone 124, as well as along the rail section 119, in the shown end position of the switch, but not within the safety zone 124 of the rail 115. In order to supply the safety zone 124 in the shown end position of the switch, another primary winding 130 is arranged on the end of the rail section 119 on the side containing the conductor loop 102 and another secondary winding 131 with the same number of windings is oppositely arranged on the end of the rail 115, such that the additional primary winding and the additional secondary winding form a transformer with a turns ratio of 1:1. The secondary winding 131 is connected to another conductor loop 132 that extends along the inner lateral surface 125 of the rail 115 from the end of the rail 115 analogous to the conductor loop 101. This conductor loop 132, the return point of which lies near the point 127 that represents the beginning of the safety zone 124, as well as the conductor loop 102 that extends along the inner lateral surface 129 of the rail section 119 respectively consist of a quadruple loop, e.g., as illustrated in the cross section according to FIG. 5.

FIG. 5 clearly shows that the conductor loop 132 and the conductor loop 102 are only supplied with power if the switch is located in the end position shown, in which the end of the movable rail section 119 with the secondary winding 122 and the primary winding 130 is located opposite of and aligned with the end of the rail 115 with the primary winding 121 and the secondary winding 131. If the end of the second movable rail section of the switch that is not illustrated in FIG. 5 is also equipped with a corresponding combination of primary and secondary windings, this applies analogously to the second end position of the switch. During the movement of the switch between the two end positions, the conductor loop 132 is automatically rendered currentless in the safety zone 124 due to the termination of the inductive coupling, without requiring sensors, control electronics and electric power switches.

The arrangement of the windings 130 and 131 in FIGS. 5 and 6 is based on the assumption that the pickup 126 travels adjacent to and is slightly separated from the rail 115 and the rail section 119 as shown in FIG. 5. In order to minimize the core of volume of the pickup 126, it would be practical to utilize an E-shaped ferromagnetic core according to FIGS. 2 and 3 for the pickup 126, wherein the collector travels in such a way that the outer legs of the core encompass the two conductors of the conductor loop 101 and the center leg protrudes between the two conductors. In this case, the windings 130 and 131 cannot be arranged at the locations illustrated in FIGS. 5 and 6 because they would obstruct at least the center leg of the core. One possible solution to this problem would be to arrange the windings 130 and 131 on the other side of the rail 115 and the rail section 119, on which the windings 121 and 122 are situated. This also applies analogously to the return points of the multiple conductor loops 102 and 132.

A second alternative solution for establishing a safety region in front of a monorailway switch in accordance with the present invention is described below with reference to FIGS. 7 and 8. In these figures, components that correspond to those in the embodiments shown in FIGS. 1–4 are identified by reference symbols that result from adding 200 to the reference symbols used in FIGS. 1–4.

Figure 7:
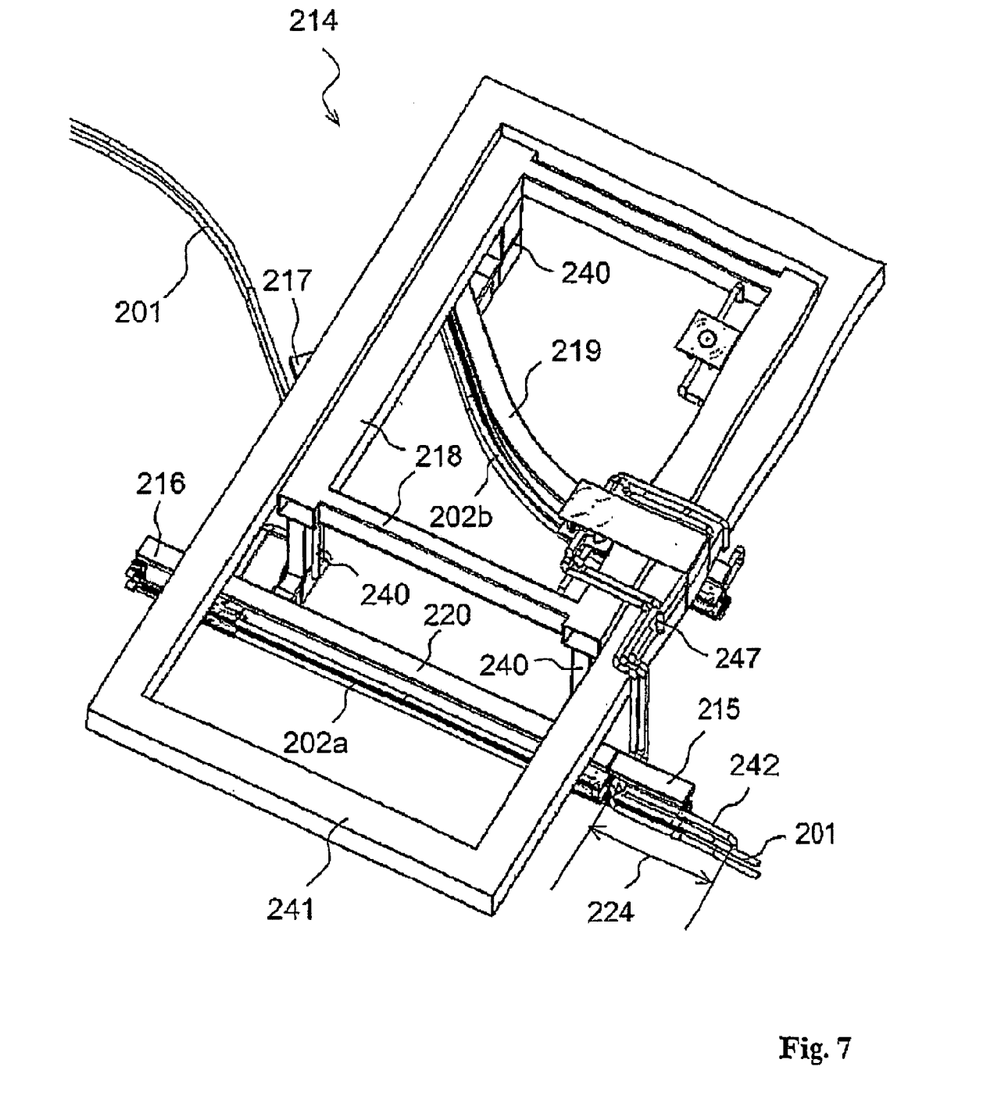
FIG. 7 shows a perspective representation of a monorailway switch that is supplied with energy by application of the invention.

FIG. 7 shows a perspective representation of a switch 214 of a monorail in the form of an electric overhead railway. The basic structure of this switch 214 corresponds to that schematically illustrated in FIG. 4. In FIG. 7, the switch 214 is in an end position in which a first movable rail section 220 connects the aligned ends of two stationary rail sections 215 and 216 in a straight line. A second movable rail section 219 that has a curved shape is mounted on a support frame 218 analogous to the first rail section, wherein the connection is respectively produced by means of angles 240 that extend downward from the support frame 218 such that the rail sections 219 and 220 are separated from the support frame 218 by a certain distance underneath said support frame.

The support frame 218, in turn, is supported in a stationary frame 241 such that it can be displaced transverse to the rail sections 215 and 216. In the other not-shown end position of the switch, the second movable rail section 219 connects the stationary rail section 215 to another stationary rail section 217. Only short end sections of the stationary rail sections 215, 216 and 217 are illustrated in FIG. 7. In FIG. 8, the end section of the rail section 217 is entirely omitted.

A conductor loop 201 is installed along the first stationary rail section 215 in order to realize the supply of energy to a vehicle. This conductor loop 201 leads to the stationary rail section 217 along the stationary frame 241 and continues along this stationary rail section. Alternatively, the conductor loop 201 could also lead to the other stationary rail section 216 along the stationary frame 241 and continue along this other stationary rail section. The energy supply of a vehicle along the movable rail sections 219 and 220 is respectively realized by means of conductor loops 202a and 202b that can be alternately coupled to the conductor loop 201 inductively depending on the position of the switch.

An additional compensation conductor loop 242 is also installed along a safety zone 224 of the rail section 215 that lies in front of the switch 214 relative to the travel direction. Power can also be inductively fed into this compensation conductor loop from the conductor loop 201, where the safety function of the compensation conductor loop is described in greater detail below with reference to FIG. 8. The frames 218 and 241 are omitted from this figure in order to provide a better overview of the progression of the various conductor loops 201, 202a, 202b and 242 and the devices for realizing their inductive coupling.

Figure 8:
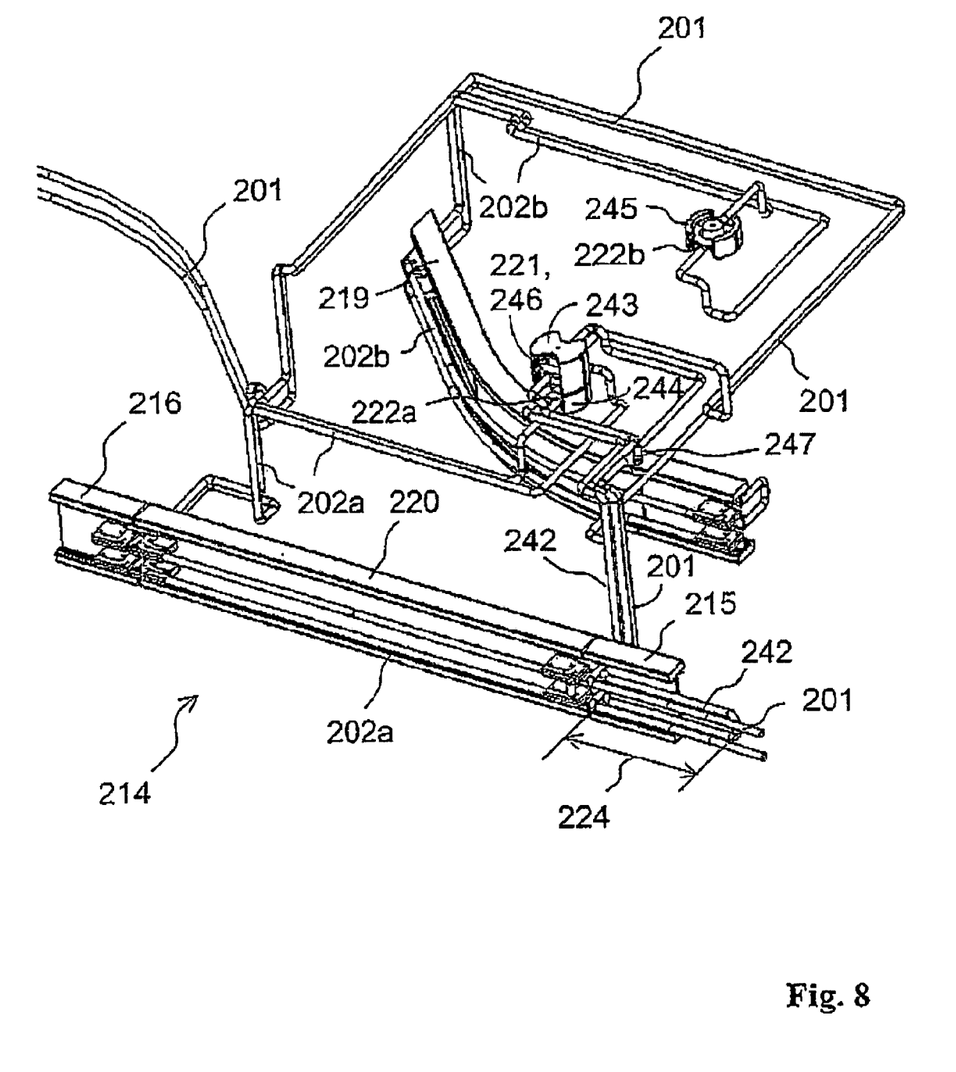
FIG. 8 shows the switch shown in FIG. 7 without its mechanical support components.

According to FIG. 8, the conductor loop 201 that leads to the switch 214 along the stationary rail section 215 initially extends in the vertical direction from the end of the rail section 215 and then around the switch 214 in a horizontal plane that lies at the level of the stationary frame 241 that appears only in FIG. 7. After another vertical section, it reaches the end of the stationary rail section 217 and continues along this stationary rail section. One of the conductors of the conductor loop 201 leads to an upper pot core part 243 and forms a winding 221 therein.

The conductor loop 202a installed along the first movable rail section 220 also extends to the level of the movable frame 218 in the form of a vertical section and leads to a first lower pot core part 244, in which it forms a winding 222a. In the end position of the switch 214 shown in FIGS. 7 and 8, the windings 221 and 222a form a transformer together with the pot core parts 243 and 244, where said transformer inductively couples the conductor loop 202a to the conductor loop 201 and thus supplies the former conductor loop with power when current flows in the conductor loop 201. The energy supply for a vehicle entering the switch 214 is thus also ensured here along the movable rail section 220.

The conductor loop 202b installed along the second movable rail section 219 also extends to the level of the movable frame 218 in the form of a vertical section and leads to a second lower pot core part 245, where it forms a winding 222b. In the other end position of the switch 214 that is not shown in FIGS. 7 and 8, the windings 221 and 222b form a transformer together with the pot core parts 243 and 245, where said transformer inductively couples the conductor loop 202b to the conductor loop 201 and thus supplies the former conductor loop with power when current flows in the conductor loop 201. The energy supply for a vehicle entering the switch 214 is thus here also ensured along the movable rail section 219.

A compensation conductor loop 242 that extends along the rail section 215 within the safety zone 224 is provided for shutting down the supply of energy to vehicles within the safety zone 224 that lies in front of the switch 214 relative to the travel direction while the frame 218 with the movable rail sections 219 and 220 is in motion. The compensation conductor loop 242 initially extends vertically from the end of the rail section 215 to the level of the stationary frame 241 like the conductor loop 201 and then along a horizontal plane to the upper pot core part 243, where it forms a winding 246. This winding 246 consequently is always inductively coupled to the winding 221 formed by the conductor loop 201 in the upper pot core part 243 independently of the position of the movable part of the switch 214.

The compensation conductor loop 242 is installed on the rail section 215 parallel and directly adjacent to the conductor loop 201 such that the magnetic fields of both conductor loops 201 and 242 nearly compensate one another [sic; cancel each other out] along the safety zone 224 if currents of the same magnitude flow in the two conductor loops 201 and 242 in opposite directions. Thus, a significant inductive transmission of energy to the pickup of the vehicle is no longer possible. The winding direction and the number of turns that form the windings 221 and 246 in the upper pot core part are chosen such that a current in the conductor loop 201 induces a current of approximately identical magnitude in the compensation conductor loop 242 outside the end positions of the switch 214, i.e., when neither of the lower pot core parts 244 or 245 is aligned with the upper pot core part 243. The energy supply in the safety zone 224 is interrupted in this way, at least outside the two end positions of the switch 214, such that no vehicles can enter the switch in this case. In this respect, it should also be noted that the length of the safety zone 224 is illustrated not-to-scale in FIGS. 7 and 8, but much shorter.

Although a certain change in the inductive coupling between the windings 221 and 246 also occurs when the respective pot core parts 243 and 244 or 243 and 245 are aligned in the two end positions of the switch 214, a significant current that, however, is undesirable in this case would always be induced in the compensation conductor loop 242 in said end positions. This would practically make it impossible to transmit energy to a vehicle within the safety zone 224. This can be prevented by interrupting the circuit of the compensation conductor loop 242 in said end positions. A switch 247 is provided in the compensation conductor loop for this purpose. This switch 247 is only schematically illustrated in FIGS. 7 and 8 and only open in the end positions of the switch 214 in order to render the compensation conductor loop 242 currentless. Otherwise, the switch is closed and allows the required compensation current to flow.

For example, the switch 247 may be positively coupled to the position of the displaceable frame 218 mechanically. However, this has the disadvantage that a malfunction of the switch during its closing renders the safety function of the compensation conductor loop 242 ineffective. However, the switch may also be directly actuated by means of one or more redundant auxiliary circuits in such a way that the auxiliary circuit(s) are closed by means of auxiliary switches in the end positions of the switch 214, and the circuit of the compensation conductor loop 242 is subsequently interrupted by means of an electrically controlled electromechanical or electronic switch. Corresponding devices for reliably carrying out electrical switching processes are known from the prior art and are successfully utilized in numerous critical safety applications. Consequently, a broad spectrum of instruments is available for this purpose.

In contrast to the embodiment described above with reference to FIGS. 5 and 6, the solution according to FIGS. 7 and 8 provides the advantage that only three transformer core parts 243, 244 and 245 are required for inductively supplying two movable rail sections 219 and 220 with energy. Six transformer core parts are required in the embodiment according to FIGS. 5 and 6. For example, FIG. 5 shows four windings 121, 122, 130 and 131 that preferably are wound on one respective core part. Two additional windings and consequently transformer core parts are required for the second movable rail section that is not shown in FIG. 5. This results in a total of six transformer core parts. On the other hand, the embodiment according to FIGS. 5 and 6 does not require an additional switch with a reliable switching function because here the switch position and the power supply of the safety zone 124 are positively coupled mechanically.

The installation of the conductor loop 201 according to FIGS. 7 and 8 from the first stationary rail section 215 to and along one of the two other stationary rail sections 217 (or alternatively 216) past the switch 214, of course, may also be utilized in the embodiment according to FIGS. 4, 5 and 6; i.e., this installation is not dependent on the special design of the safety zone 224 in the form of a compensation conductor loop 242.

Although the embodiments according to FIGS. 5–8 represent practical additional refinements of the embodiment according to FIG. 4, the embodiment according to FIG. 4 is also able to function independently, i.e., without this additional refinement, if no safety zone 24 is required in front of the switch 14 or is realized conventionally. In the latter instance, the conductor loop installed along the rail 15 ends at the beginning of the safety zone 24 and the separate conductor loop is installed in the latter. At the beginning of the safety zone 24, this separate conducted loop is inductively coupled to the conductor loop that ends at this location, i.e., the conductor loop that has its return point at this location, by means of an arrangement of the type illustrated in FIG. 2. The separate conductor loop is switched off in the safety zone 24, if so required, by means of the short-circuit switch 10 described above with reference to FIG. 2. As mentioned above, safety zones that can be switched off are not only of interest in connection with switches.

With respect to the embodiments shown in FIGS. 4–8, it should also be noted that the invention is suitable for supplying not only switches of monorails, but also switches of railroads with two rails, as well as steerable vehicles that are not rail-bound. In the latter-mentioned instances, it may be reasonable or even required, e.g., for safety reasons, to realize the supply of energy such that it can be switched off in the region of a path junction. As described above, this can be realized with the aid of the present invention by means of a switchable short-circuit path parallel to the secondary winding or a relative movement between the two parts of a split transformer or a switchable compensation conductor loop. Thus, the invention is not limited to the above-described example of a monorail. The invention also is not limited to the type of switch used in the embodiments, namely a Y-switch for branching off a route in two directions. Naturally, the invention may also be utilized in multi-path switches, e.g., X-switches, or on a turntable, on which a movable rail section is turned into a different direction together with a vehicle situated thereon or thereunder.

Although the previous description was based on the preferred utilization of specially designed transformers with ferromagnetic cores for inductively coupling two conductor loops, it would also be conceivable to eliminate entirely a transformer winding on the side of the primary conductor loop and to simply couple the secondary conductor loop by means of an inductive pickup as is typically provided on the mobile load, in order to draw power from the conductor loop. Although the coupling is not as powerful as with a specially designed transformer in this case, the expenditure associated with this solution is much lower. The secondary conductor loop can also be arranged at any arbitrary location of the primary conductor loop without requiring preparation and can be easily displaced thereafter.

What is claimed is:

1. A device for inductively transmitting electrical energy to at least one mobile load, with at least one primary conductor that extends along a designated path of the load in the form of a conductor loop and from which a secondary conductor arranged on the load is able to draw electrical energy, comprising at least two conductor loops that are electrically separated from one another and respectively assigned to different segments of the path, wherein said conductor loops are arranged relative to one another so that electrical energy intended for the load can be transmitted from a first conductor loop to at least a second conductor loop due to inductive coupling between the conductor loops, wherein a section of the second conductor loop to be inductively coupled contains a larger number of windings than that of the first conductor loop, and wherein the second conductor loop includes of a series of partial loops that extend parallel to one another.

2. The device according to claim 1, wherein sections of both conductor loops to be inductively coupled, respectively, contain at least one winding.

3. The device according to claim 1, wherein the sections of both conductor loops to be coupled are wound on ferromagnetic cores that are aligned relative to one another such that they approximately correspond to a transformer core in order to produce the coupling.

4. The device according to claim 3, wherein the ferromagnetic cores are respectively in the form of an E.

5. The device according to claim 1, wherein the section of the second conductor loop to be inductively coupled corresponds to a secondary conductor of the type arranged on the mobile load that makes it possible to realize an inductive coupling with the first conductor loop over its entire length.

6. The device according to claim 1, wherein the section of the first conductor loop to be inductively coupled contains a single winding.

7. The device according to claim 1, wherein the number of partial loops corresponds at least approximately to the step ratio of the current during the transmission from the first conductor loop to the second conductor loop.

8. The device according to claim 1, wherein the partial loops are formed by a single multiwire cable, some wires of which are connected in paired fashion at their ends in order to form the partial loops.

9. The device according to claim 1, wherein at least one capacitor is connected in series with the second conductor loop, wherein the ratings of the capacitor are chosen such that the coupling or decoupling of the conductor loops changes as little as possible the input impedance of the first conductor loop at its beginning that is connected to a current source.

10. The device according to claim 1, wherein a switch is connected in parallel with the section of the second conductor loop to be coupled in order to short-circuit this section.

11. The device according to claim 1, wherein at least three conductor loops electrically separated from one another are successively arranged and inductively coupled to one another in paired fashion such that electrical energy intended for the load can be successively transmitted, starting from the first conductor loop, from one conductor loop to the next conductor loop due to the inductive coupling.

12. The device according to claim 1, wherein the section of at least one conductor loop to be inductively coupled with the respectively other conductor loop is arranged in movable fashion such that the conductor loops can be coupled and decoupled reversibly.

13. A device for inductively transmitting electrical energy to at least one mobile load, with at least one primary conductor that extends along a designated path of the load in the form of a conductor loop and from which a secondary conductor arranged on the load is able to draw electrical energy, wherein at least two conductor loops are provided that are electrically separated from one another and respectively assigned to different segments of the path, and wherein said conductor loops are arranged,relative to one another in such a way that electrical energy intended for the load can be transmitted from a first conductor loop to at least a second conductor loop due to the inductive coupling between the conductor loops, wherein the section of at least one conductor loop to be inductively coupled respectively to the other conductor loop is arranged movably such that the conductor loops can be coupled and decoupled reversibly, wherein the mobile load is guided on rails, and wherein the movable section of one conductor loop to be inductively coupled is connected to a movable part of a railroad switch so that the coupling is only produced in an end position of the railroad switch.

14. The device according to claim 13, wherein the second conductor loop is provided for transmitting energy to the mobile load in the region of the railroad switch.

15. The device according to claim 13, wherein the second conductor loop contains another section to be coupled to a third conductor loop, and wherein this coupling is also produced only in said end position of the railroad switch.

16. The device according to claim 13, characterized by fact that the mobile load is guided or suspended on a rail.

17. The device according to claim 13, characterized by the fact that a separate conductor loop is assigned to a rail segment of predetermined length that lies directly in front of the railroad switch relative to the direction of the travel of the load in order to inductively transmit energy to the load, wherein said separate conductor loop also is only inductively supplied with power by the movable part of the railroad switch in its end positions.

18. The device according to claim 17, wherein the current is initially transmitted inductively from the rail segment that lies in front of the railroad switch to the movable part of the railroad switch and then inductively transmitted back to the conductor loop assigned to this rail segment.

19. The device according to claim 13, wherein a compensation conductor loop is arranged adjacent to the first conductor loop in a rail segment of predetermined length that lies directly in front of the railroad switch so that its magnetic field compensates for the magnetic field of the first conductor loop in said path segment when it is supplied with current of suitable magnitude and direction.

20. The device according to claim 19, wherein the compensation conductor loop is inductively coupled to the first conductor loop in such a way that the current of suitable magnitude and direction is generated therein at least outside the end positions of the railroad switch.

21. The device according to claim 20, wherein its circuit contains a switch that is closed outside the end positions of the railroad switch and only opens in the end positions of the railroad switch.

22. The device according to claim 21, wherein the section of the first conductor loop that serves for the inductive coupling with the compensation conductor loop is simultaneously utilized for producing the coupling between the first conductor loop and the second conductor loop in the end positions of the railroad switch.

23. The device according to claim 22, wherein a winding formed by the first conductor loop and a winding formed by the compensation conductor loop are arranged on a common part of a ferromagnetic core, wherein a second ferromagnetic core part, on which the second conductor loop forms a winding, is respectively moved toward the first-mentioned ferromagnetic core in the end positions of the railroad switch to such an extent that a transformer with three windings is formed.

24. The device according to claim 13, wherein the first conductor loop is installed, starting from a stationary rail segment that is located adjacent to the railroad switch, such that it extends past the movable parts of the railroad switch and then leads to and along at least one of the other stationary rail segments located adjacent to the railroad switch.

* * * * *